United States Patent [19]

Krilov

[11] Patent Number: 4,688,458
[45] Date of Patent: Aug. 25, 1987

[54] BANDSAW BLADES FOR MILLING TIMBER

[75] Inventor: Alexandre Krilov, West Pennant Hills, Australia

[73] Assignee: The Minister for Industry and Decentralisation of the State of New South Wales, New South Wales, Australia

[21] Appl. No.: 741,669
[22] PCT Filed: Aug. 29, 1984
[86] PCT No.: PCT/AU84/00165
§ 371 Date: Apr. 22, 1985
§ 102(e) Date: Apr. 22, 1985
[87] PCT Pub. No.: WO85/01008
PCT Pub. Date: Mar. 14, 1985

[30] Foreign Application Priority Data

Aug. 30, 1983 [AU] Australia ............................... PC1131

[51] Int. Cl.⁴ ............................................. B27B 33/06
[52] U.S. Cl. ......................................... 83/661; 83/835
[58] Field of Search ..................... 83/835, 661; 76/112

[56] References Cited

U.S. PATENT DOCUMENTS

| 604,603 | 5/1898 | Caruthers | 83/835 |
| 1,130,650 | 3/1915 | Whitaker | 76/112 |
| 1,352,140 | 9/1920 | Napier | 76/112 |
| 2,644,494 | 7/1953 | Lundberg . | |
| 2,734,533 | 2/1956 | Roberts | 83/661 |
| 2,787,299 | 4/1957 | Anderson . | |
| 3,651,841 | 3/1972 | Ohlsson | 83/835 X |
| 4,031,793 | 6/1977 | Miaskoff . | |
| 4,232,578 | 11/1980 | Stellinger et al. . | |

FOREIGN PATENT DOCUMENTS

| 566865 | 12/1958 | Canada | 76/112 |
| 590282 | 7/1947 | United Kingdom . | |
| 622601 | 5/1949 | United Kingdom . | |
| 1196745 | 7/1970 | United Kingdom . | |

Primary Examiner—Frank T. Yost
Attorney, Agent, or Firm—Parmelee, Miller, Welsh & Kratz

[57] ABSTRACT

A bandsaw blade for use in milling timber having in-line swaged teeth, wherein the cutting tip of each tooth, in front profile, is triangular in shape with a central apical point (30) and two side points (32, 34). Preferably, the apical angle ($\theta$) is from 60° to 140°, with the base angles ($\gamma$) of the tip being equal to one another and lying from 20° to 60°, thus providing an elongate pentagon shape in front profile. Also, a dark blue temper band (50) may be curved so that its top is spaced below the apical point (30) by a distance of 0.5 to 1.3 times, preferably 0.6 to 1.2 times, the blade thickness.

3 Claims, 8 Drawing Figures

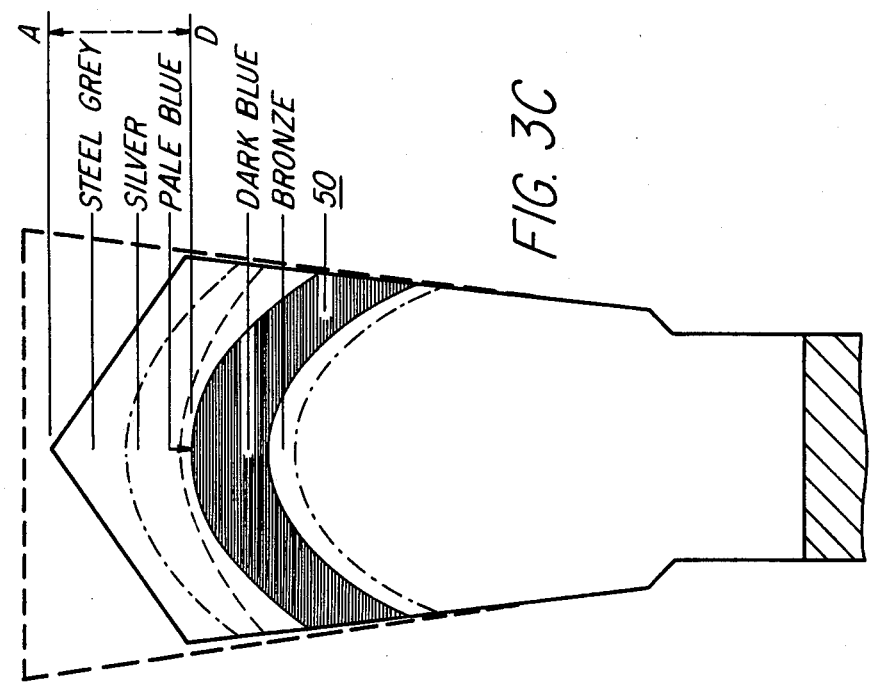
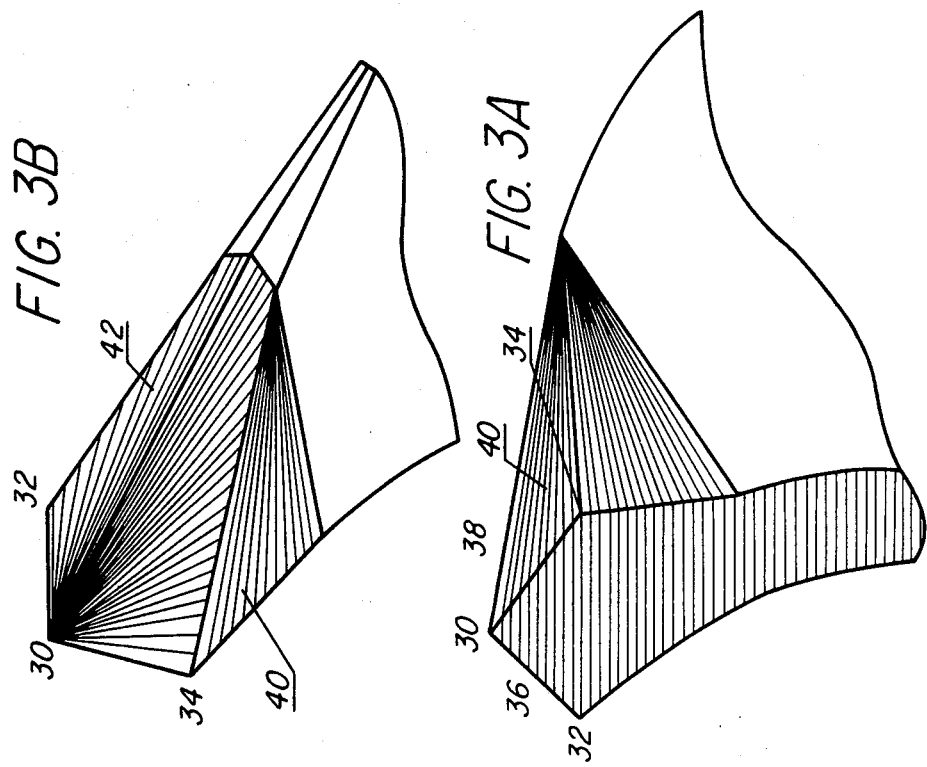

BANDSAW BLADES FOR MILLING TIMBER

TECHNICAL FIELD

This invention relates to bandsaw blades for milling timber and, more particularly, to tooth forms for use in such blades. Its objective is to allow the production of bandsaw blades which have a longer effective cutting time, improved production rates, lower power consumption and reduced kerf loss.

BACKGROUND ART

Though diminishing timber resources and increasing energy costs have created a strong demand for more efficient timber milling techniques, little attention has been paid to the improvement of tooth design. This is because saw tooth design is a well-worked art with a sound theoretical and empirical base which has determined the tooth shapes used on large bandsaws for many years. A steady increase in bandsaw performance has been achieved over the past thirty years by the use of improved alloy steel for blades, particularly through the introduction of steels and equipment which allows saw teeth to be sharpened and locally hardened at the mill. The tough alloys used reduce tip breakage and, when hardened, are resistant to abrasive wear, which is particularly important when sawing highly siliceous timber. Basic saw tooth shape, however, has remained essentially unchanged during this period.

DISCLOSURE OF INVENTION

In such a well-worked art and in such an economic climate, it would be most surprising to find that productivity improvements of up to 30% could be obtained using existing saw blade alloys and hardening techniques by changing tooth profile and by carefully controlling tip hardness, yet the present invention demonstrates such improvements are realistic. Instead of the conventional trapezoidal, or flat-top, tooth shape employed for in-line and swaged bandsaws, the teeth formed in accordance with the present invention each have a cutting tip which, in front profile, is triangular in shape, with, for instance, an elongate pentagonal or pointed-top, tooth shape, with a central apical point and two side points. Preferably, the apical angle ($\theta$), namely, the included angle of the central point is, from 60° to 140°, while the side or base angles ($\gamma$) of the triangular tip are from 20° to 60°.

It is also preferable, but not essential, for the tooth hook angle, in side profile, to be significantly increased over that which is conventional. Thus, hook angles as large as 35° are now employed cutting very dense and silicious timbers, in which the conventional angles of up to 25° only were traditionally used. Similarly, the sharpness angle is preferably reduced to improve penetration; angles of as little as 35° may be used with softwoods, though angles from 40° to 45° will be more usual. Clearance angles of from 15° to 20° are thus contemplated.

The pointed-top tooth form allows the overall width of the tooth to be significantly reduced without increasing lateral vibration when in use, so that valuable reductions in kerf loss can be obtained. For optimum performance, it is recommended that teeth formed in accordance with the present invention should be high-frequency induction hardened to give a tip hardness of between 900 and 920 Diamond Pyramid hardness number (DPN). A convenient way, according to the present invention, of obtaining this hardness at the mill without using elaborate and destructive hardness measurements, is to employ standard hardening grade blade steels and to adjust the high-frequency coil inductor until a dark blue temper band is produced on the face of the tooth such that its top lies between 0.5 and 1.3 times the blade thickness below the tooth apex. Forced cooling by way of an air flow is preferably used to ensure that all teeth are treated uniformly.

To further portray the nature of the present invention, a detailed comparison between the performance of a bandsaw with conventional tooth form and one with the tooth form of the present invention will be described with reference to the accompanying drawings. First, however, a brief review of the theoretical considerations underlying the radical new tooth form will be provided, also with reference to the accompanying drawings.

BRIEF DESCRIPTION OF DRAWINGS

In the drawings:

FIG. 3A is a perspective view of a bandsaw tooth formed in accordance with the present invention;

FIG. 3B is a second perspective view of the bandsaw tooth shown in FIG. 3A;

FIG. 3C is a front profile of the bandsaw tooth shown in FIG. 3A, including a comparison with the front profile of a conventional bandsaw tooth.

MODES FOR CARRYING OUT THE INVENTION

Figure 1A:
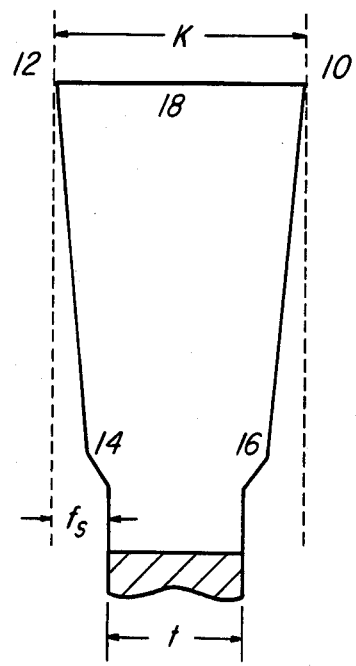
FIG. 1A illustrates the front profile of a conventional bandsaw tooth used for milling timber.

A great many factors must be considered in providing any theoretical analysis of the cutting action of a saw tooth that takes into account the forces acting on the tooth as it is driven through a non-homogenous substance such as wood, as well as the mechanisms of chip production and tooth wear. Various authorities in the art have propounded over twenty fundamental and largely independent equations in conducting various elements of this analysis. An excellent review of the art may be found in the text "Wood Machining Processes" by P. Koch, Ronald Press, NY (1964). Unfortunately, little of the analysis can be applied directly to the prescription of tooth form, this being left to empirical criteria derived from experience; and this is particularly so in regard to effective tooth life or the mean time between sharpenings. A "perfectly sharp" tooth is of little value if it has a rapid rate of wear. It is thus characteristic of the industry that most mills employ their own "saw doctor" who has his own recipe for tooth profiling when resharpening.

Sawmillers appreciate that progressive dulling of the tooth cutting point or edge adversely affects chip formation. Theoretical studies confirm this by pointing to the way in which tool forces cause increasing compression and shear failure in the wood ahead of the tooth edge as the tooth becomes blunter. They point to the existence of a critical sharpness angle which, if exceeded through tooth edge wear or breakage, will have an adverse effect upon chip characteristics. The inventor has demonstrated the existence of an optimal chip for a given timber feed rate and blade type, it being shown that, when a high proportion of chips produced are of the optimum size, the blade is cutting efficiently. As the teeth wear, the percentage of these well-formed optimum chips decreases and the proportion of compressed and fragmented chips of smaller size increases. These studies were reported in a paper entitled "Dimensional Saw-Chip Formation; Non-Destructive Indication of Blade Behaviour" published in Holz als Rohund Werkstoff, 35 (1977) pp 307-310. It was also demonstrated that the loss of metal from a saw during a milling operation was closely correlated to the blade condition as indicated by the proportion of optimum chips in the sawdust produced at any given time. This work was published in the above Journal in 1979 (No. 37, pp 353-358) in an article entitled "Non-Destructive Method for Continuous Sawtooth Wear Assessment".

The last-mentioned paper also demonstrated that there are two distinct phases of tooth metal loss; in the first, which occurs in the first 15 minutes of cutting, metal is rapidly lost by brittle fracture as the sharp cutting edges come into contact with hard and abrasive portions of the timber; in the second, a succeeding and much longer period, metal loss is due to fatigue and occurs at a decreasing rate as the cutting edge becomes rounded. Physical examination of a saw confirms these findings in a qualitive way and indicates that much of the metal loss in the first phase is due to the side corners of the teeth being chipped away. These studies were carried out upon saws used in general practice with conventionally shaped teeth and, being prepared for hardwood, had the following characteristics:

Manufacture: Uddeholm,
Alloy Type: High-nickel; type ASSAB 5445,
Blade Thickness (t): 2.41 mm,
Blade Width: 350 mm,
Number of Teeth: 264,
Tooth pitch (p): 57 mm,
Gullet depth ($h_t$) 23 mm,
Hook angle (a): 25.0°,
Sharpness angle (B): 44.0°,
Clearance angle ($\gamma$): 21.0°,
Side swage ($f_s$): 0.8 mm,
Kerf width (k): 4.1 mm,
Tip hardness: 860 DPN.

Figure 1B:
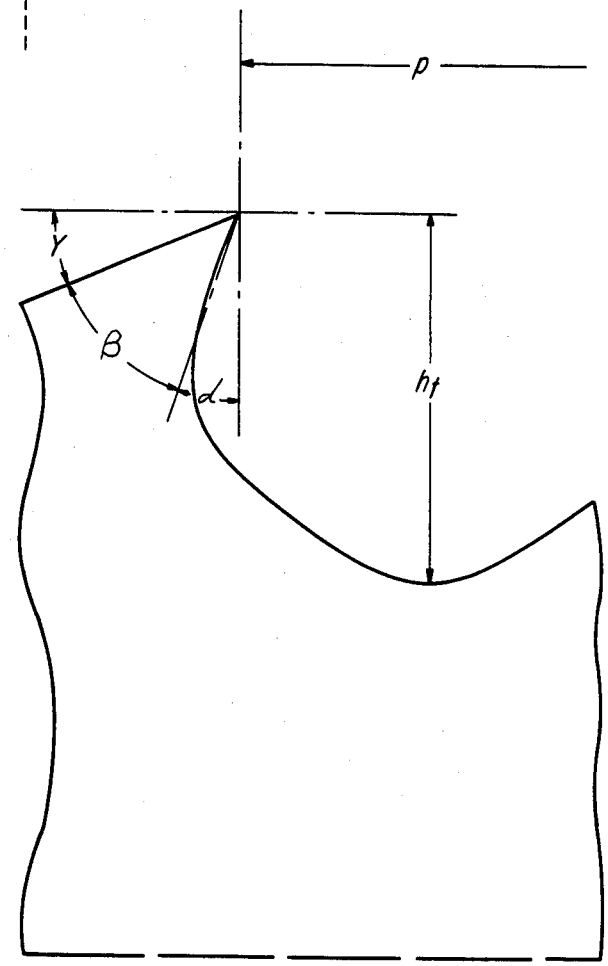
FIG. 1B illustrates the side profile of the bandsaw tooth of FIG. 1A.

FIG. 1 illustrates the tooth form of such a blade and identifies the various angles and dimensions by the letters given in brackets above. View A of FIG. 1 depicts the front profile of a tooth, while View B shows the side profile. As clearly shown by view A, the swaged portion of the conventional tooth has a trapezoidal shape in front profile, the trapezoid being bounded by the two cutting tips 10 and 12 and the two swage shoulders 14 and 16. The cutting edge 18 of the tooth is the line which joins corners 10 and 12.

It can be concluded from the analysis outlined above that the corners (references 10, 12, FIG. 1A) of the conventional tooth are too vulnerable to overload and brittle fracture, but the only way to reduce this in such a tooth form, is to increase the sharpness angle (B); that is, make the tooth blunter. In fact, the standard tooth shape indicated in FIG. 1 represents an optimum balance between tip breakage and sharpness angle which has been struck by many years experience in sawmilling throughout the world.

According to the present invention, however, it is possible to both provide better support for the tooth side corners 10, 12 and to reduce the sharpness angle (B) at the same time. This is achieved by forming a third, central or apical, tooth point (reference 30 in FIG. 2A), so that the tooth tip has a triangular shape, thereby allowing significantly larger side corner angles and therefore better supported corners (reference 32, FIG. 2), which are less vulnerable to overload and brittle fracture. Because the cutting force is now spread over three shear points instead of two and because the cutting edge has now been significantly increased in length, the stress to which it is subject is very greatly reduced, allowing the tooth hook angle to be significantly increased and the sharpness angle correspondingly reduced so that timber penetration is greatly improved. In short, the saw cuts much better.

Figure 2B:
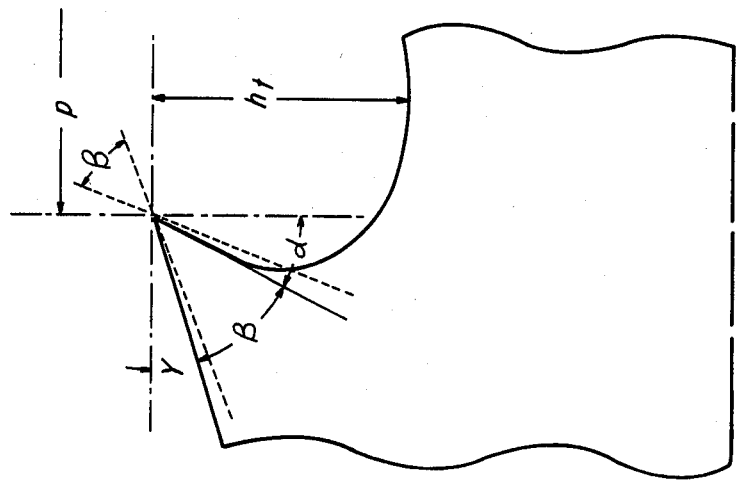
FIG. 2B depicts the side profile of the bandsaw tooth of FIG. 2A, including a comparison with the side profile of a conventional bandsaw tooth.
Figure 2A:
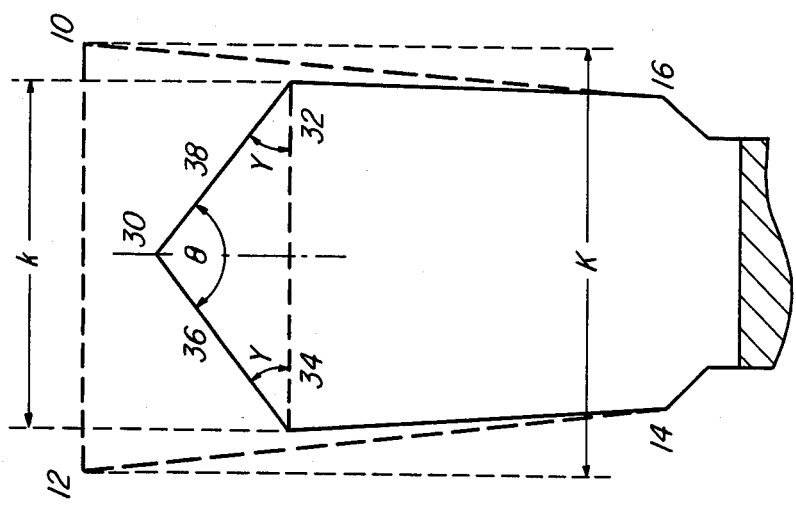
FIG. 2A depicts the front profile of a bandsaw tooth formed in accordance with the present invention, including a comparison with the front profile of a conventional bandsaw tooth.

FIG. 2 contrasts the tooth form of the present invention (shown in solid lines) with the conventional (shown in dotted lines). It will be seen that the swaged portion of the tooth has an elongated pentagonal shape (bounded by points 30, 34, 14, 16 and 32) instead of the conventional trapezoidal shape. The two new side cutting edges 36 and 38 which flank the apical tooth point 30, each must have a suitable following bevel clearance to ensure proper cutting. This is shown by the perspective views A and B of the new tooth form illustrated in FIG. 3, the bevelled clearance faces being indicated by 40 and 42 respectively. As shown by FIG. 2A, the angle of the side corners 32 and 34 is measured as the base angle of the isosceles triangle 30, 32, 34 and is indicated by angle ($\gamma$).

Examination of FIG. 2A, reveals another significant advantage of the new tooth form; namely, the reduced kerf (K), which comes about by the bevelling of the tooth top so that the side corners are positioned lower on the tapering swaged portion of the tooth. Reduction of the effective tooth width results in less kerf loss but a greater saving is possible in this regard than is indicated by the simple geometry of the triangular tooth tip. This is because, first, the tooth has been made stiffer by effectively lowering the cutting edge without increasing the gullet depth ($h_t$) and, second, the sloping sides 36, 38 of the triangular tip tend to stabilise the tooth against lateral vibration during cutting, both factors thereby allowing further reduction in the thickness of the swage to give the same effective tooth stiffness and strength as a conventional blade. A total reduction of overall tooth width of up to 15% over conventional blades is possible, representing a most significant saving in timber.

The range of geometrical forms envisaged by the present invention has already been indicated above, but one specific example will now be described so that comparative performance data can be given. Three bandsaw blade types are involved in this comparison:

(i) An unhardened conventional blade (C) having the tooth form listed above and the blade hardness of 860-880 DPN;
(ii) a blade (M) having the new pentagonal tooth shape but otherwise not optimised; and (iii) a blade (E) having the pentagonal shape and the optimised tooth form as indicated above.

TABLE 1

Parameters and Tooth Profiles for the C, M and E Blades.

| Parameters | Sawtooth profiles | | |
|---|---|---|---|
| | Conventional (C) | Partly modified (M) | Fully modified (E) |
| Pitch (p) | 57 mm | 57 mm | 57 mm |
| Hook angle ($\alpha$) | 25.0° | 30.0° | 30.0° |
| Sharpness angle ($\beta$) | 44.0° | 40.7° | 42.5° |
| Clearance angle ($\gamma$) | 21.0° | 19.3° | 17.5° |
| Gullet depth ($h_t$) | 23 mm | 23 mm | 21 mm |
| Gullet area (S) | standard | standard | reduced |
| Gullet profile ($S_p$) | not well rounded | not well rounded | fully rounded with base of tooth straightened |
| Side swage (f) | 0.75–0.80 mm | 0.75–0.80 mm | 0.60–0.65 mm |
| Slope angle ($\omega$) | does not exist: conventional flat surface | 48.0° | 37.0° |
| Apic angle ($\theta$) | | 84.0° | 106.0° |
| Hardness (DPN) | not hardened | 860–901 | 915 |

Figure 4:
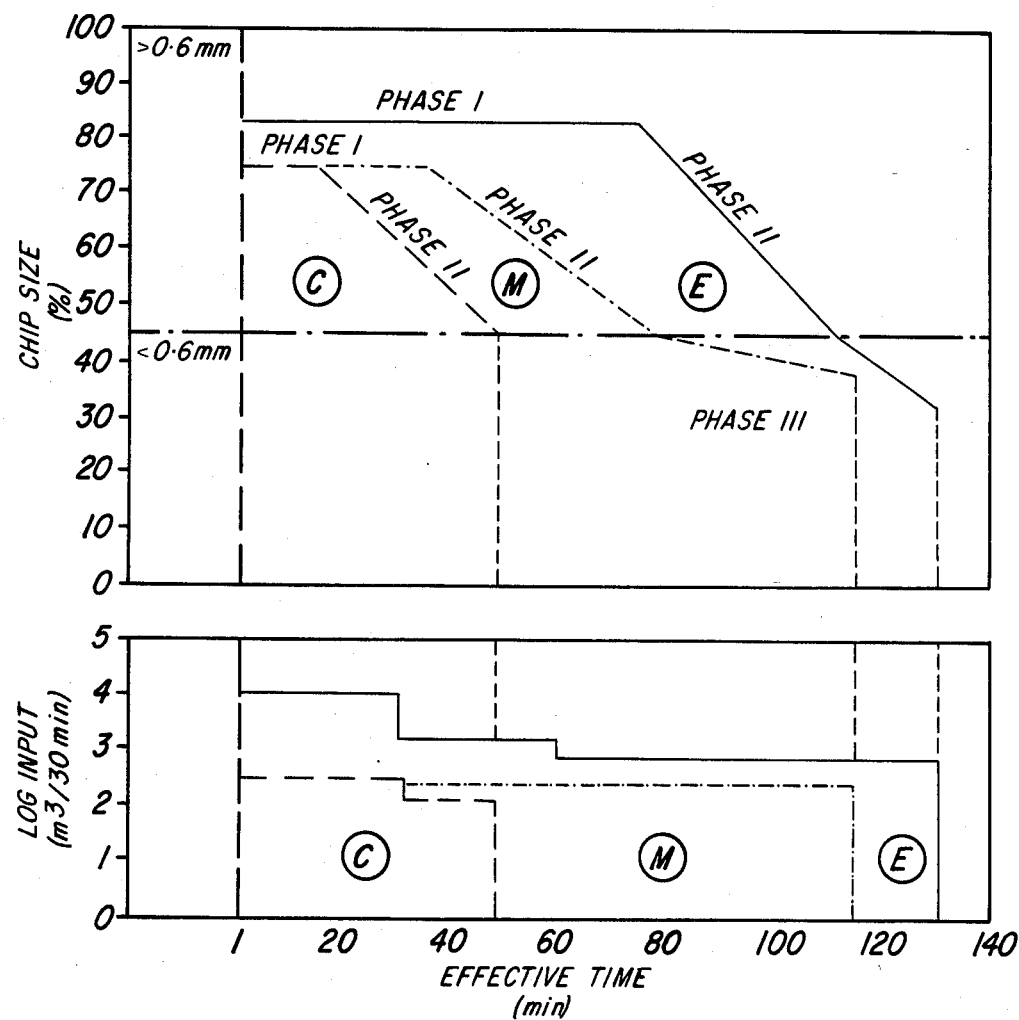
FIG. 4 is a graphical comparison of the performance of three saw blade types; the upper part plots the percentage of optimally dimensional chips produced against time, while the lower depicts saw-log input against time.

These blades were used at the same mill on a stock of hardwood (tristania conferta) logs selected to be as uniform as possible. The overall results of these trials are indicated in Table 2 below and amply confirm the superiority of the new tooth form. However, as discussed in the first of the two papers cited above, a more telling way to depict blade performance during use is on a graph which plots optimal chip size against duration of cut (or log input), it being shown that the blade should be taken off for resharpening when the proportion of optimum size chips falls to <50%. FIG. 4 provides such a diagram for the averages of three blade types and the comparative trials described. From this, it will be seen that the duration of Phase 1 (or optimal cutting) for blades formed in accordance with the present invention is not only much longer than for a comparable blade (M), but the rate of degradation of the blade during Phase II cutting is significantly less. Phase II terminates at the ~50% optimal chip level and leads to Phase III, in which damaging and counterproductive cutting occurs. The average effective cutting time per blade listed in Table 2 is the cutting time before sharpening. Although it approximates the end of Phase II cutting, it was in fact determined by the mill operator's decision to remove the blade for resharpening. The surprising degree of improvement is clear from Table 2, the graph of FIG. 4 and the log input diagram forming part of FIG. 4.

As indicated at the outset, optimal hardening of the teeth formed in accordance with the present invention is critical, as it would be for any tooth shape which was to be hardened. It has been found that alloy steels commonly employed in the production of large bandsaw blades for sawmilling are reasonably uniform in character and that reliance may be placed upon tooth face colour after these were hardened, as a precise indicator of optimal hardening. More specifically, after high frequency hardening, the face of a tooth formed in accordance with the present invention should have a dark blue upwardly-curved temper band visible, the topmost central edge of which is spaced between 0.6 and 1.2 times the blade thickness from the apical tip, and preferably between 0.2 and 1.2 times the blade thickness below the swaged side tips of the tooth. The position of the dark blue temper band is indicated in FIG. 3C, by reference 50. The precise location of this band on (E) profile saws manufactured from Uddeholm steel, which were used in the trials summarised in Table 2 is 1.0 times the blade thickness for the distance A–D (FIG. 3C), and 0.9 times the blade thickness below the swaged side tips of the tooth. It should be noted also, that in the comparative trials described above, blades (M) and (E) were both high-frequency hardened using the same induction hardening machine.

Having described one comparative trial on hardwood using a specific tooth profile formed in accordance with the present invention, those skilled in the art will appreciate that some adjustment in the tooth profile is always needed to suit the particular timber species being cut. Therefore, any triangular tooth form within a fairly wide range can be employed without departing from the scope of the present invention. For example, when cutting P. radiata, which is soft and has little silica inclusions, more sharply pointed teeth can be employed. An apical angle as little as 80° may be suitable (giving base angles of 50° each) and a hook angle of as much as 35° may be used in conjunction with a sharpness angle of as little as 35° and a clearance angle of 20°. However, teeth of such extreme form need careful hardening, as described, even when used on softwoods, where the feed rates well in excess of those feasible with conventional blades may be expected. At the other end of the spectrum it may be desirable to use apical angles of as much as 103° (giving base angles of as little as 30°) and a hook angle of as little as 26° and a sharpness angle of as much as 45° where extremely difficult hardwood species or other abrasive materials are to be processed. More usual will be the case where the range of medium density hardwoods are being cut, and where hardening can be carried out as prescribed. In such cases, the tooth form provided in the specific example described will provide an excellent form from which to start.

It should be noted also that in future, the application of the new saw tooth profile might be extended toward processing other types of material than timber, including metal and plastics.

I claim:

TABLE 2

Feed Speed Data for the C, M, and E Blades

| Blade code | Average log length (m) | Average depth of cut (m) | Average effective cutting time per test (min) | Time per average log length (sec) | Mean feed speed per blade (m/sec) | Average feed speed per test (m/min) |
|---|---|---|---|---|---|---|
| C | 4.37 | 0.38 | 48 | 8.3 | 0.527 | 31.5 |
| M | 4.02 | 0.42 | 114 | 7.6 | 0.539 | 32.3 |
| E | 4.31 | 0.44 | 130 | 6.4 | 0.673 | 40.4 |

1. A bandsaw blade for use in the milling of timber and which has in-line swaged teeth; the swaged portion of each tooth being shaped as an elongate pentagon which blends uniformly into adjacent unswaged regions of the tooth, the swaged portion of each tooth having a front face which is substantially planar, a hook angle of 25° to 35°, a sharpness angle of 40° to 45°, a clearance angle of 15° to 20° and a cutting tip which, in front profile, is triangular in shape, the triangular cutting tip having a central apical angle falling within the range of 60° to 140° and base angles falling within the range of 20° to 60°, and is hardened to a hardness level falling within the range of 900 to 920 DPN.

2. The bandsaw blade as claimed in claim 1 wherein each tooth is hardened in a manner such that a dark blue temper band is present with an uppermost portion of the band being spaced below the apical point by a distance corresponding to 0.5 to 1.3 times the blade thickness.

3. The bandsaw blade as claimed in claim 1 wherein each tooth is hardened to such an extent that a dark blue temper band is present with an uppermost portion of the band being spaced below the apical point of the tooth by a distance corresponding to 0.6 to 1.2 times the blade thickness and wherein the temper band is curved such that it is spaced from side points of the tooth by a distance corresponding to 0.2 to 1.2 times the blade thickness.

* * * * *